Nov. 13, 1962    M. L. BLAIR ETAL    3,063,088
MULTI-POSITION HINGE
Filed Sept. 28, 1960
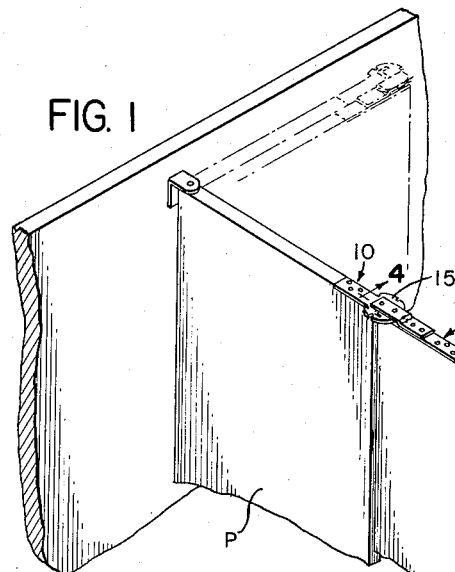
FIG. 1
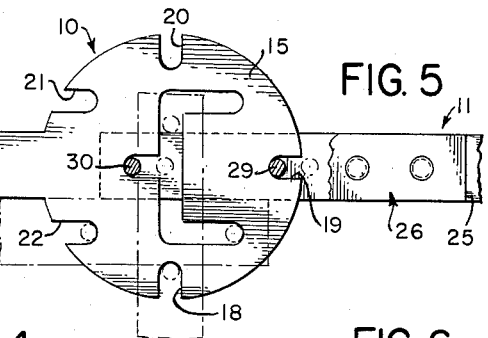
FIG. 5
FIG. 6
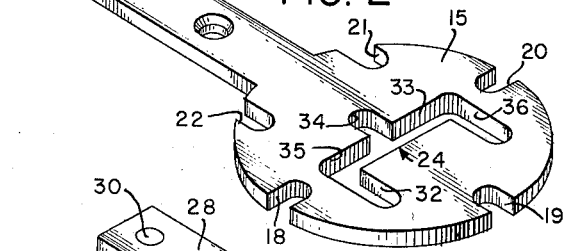
FIG. 2
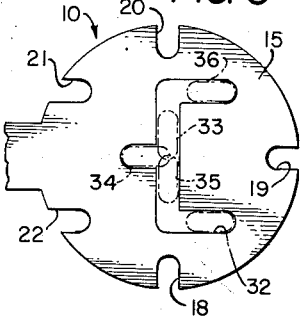
FIG. 7
FIG. 8
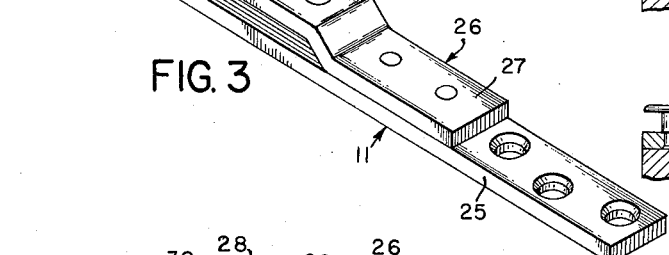
FIG. 3
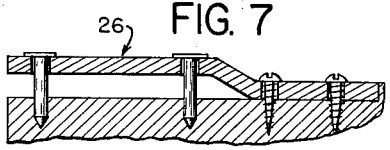
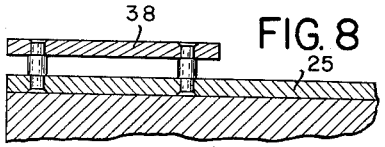
FIG. 9
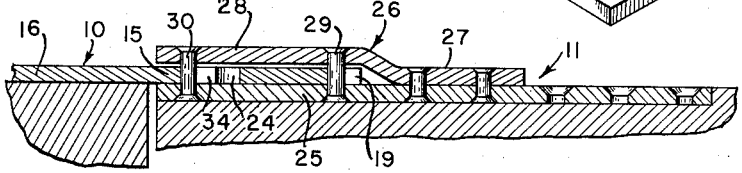
FIG. 4
INVENTORS
MARY LEE BLAIR
J. ROBERT BLAIR
BY
ATTORNEY 3,063,088
MULTI-POSITION HINGE
Mary Lee Blair and John Robert Blair, both of 926 Skeet Club Road, High Point, N.C.
Filed Sept. 28, 1960, Ser. No. 59,034
5 Claims. (Cl. 16—179)

This invention relates to structural elements and more particularly to a hinge by means of which a pair of elements may be adjustably positioned and positively held with respect to each other.

In the construction of various articles of furniture, toys and other articles it is sometimes desirable to mount a swingable member for rotation about a pivot. In certain devices such as mirrors, easels, partitions, lids and other closures it is sometimes desirable that the mounting permit easy adjustment from one position to another and provide for holding the parts in a selected position. Various types of hinges and devices for maintaining hinged articles in selected position have been provided, but these have oftentimes been complex, costly and of relatively short life.

Accordingly, it is an object of the present invention to provide an adjustable hinge member which permits the members to be positively maintained in any one of a number of selected positions.

A further object is the provision of a simple, inexpensive hinge member which permits positive locking in any of several positions and which is sturdy, easy to operate and long lasting, including not requiring springs or other appurtenances which are relatively short lived.

These and other objects of the invention will become apparent from the following description taken in conjunction with the accompanying drawing, in which:

FIG. 1 is a perspective illustrating a hinge constructed in accordance with the present invention applied to a multisection foldable partition;

FIGS. 2 and 3, enlarged perspectives of the two interengaging hinge members;

FIG. 4, a section to an enlarged scale, on the line 4—4 of FIG. 1;

FIG. 5, a fragmentary plan view of the interengaged hinge members, illustrating, in phantom, various relative positions of the two members;

FIG. 6, a fragmentary plan view of the plate member, indicating the reciprocating path of the pin in the keyway slot in the various positions of the interengaging bracket member; and FIGS. 7, 8 and 9, vertical sections of modified bracket members.

Briefly stated the present invention includes a hinge plate having a circular main portion with a plurality of peripheral slots, each having an elongated internal slot in alignment or parallel thereto, each peripheral slot and its associated internal slot receiving a pair of spaced pins mounted in the associated bracket member, the bracket member having an inner pin engagable with a peripheral slot by translating motion of the bracket member and when disengaged being swingable to another position.

With further reference to the drawing, the hinge of the present invention includes a plate member 10 and a bracket member 11. These members may be attached to various articles, that illustrated constituting a foldable partition having a series of panels P and attached to a wall. In such installation the plate member 10 is mounted on one section and the bracket member is attached to the other.

The plate member has a circular main portion 15 from which an arm 16 extends, the latter being attached to the desk in such a way that the main portion 15 extends therefrom. The main portion is provided with a plurality of radial slots 18, 19 and 20 and with other slots 21, 22 which extend in a non-radial direction. The circular main portion has an internal keyway 24 comprised of communicating slots in alignment with the peripheral slots 18–22.

Although various arrangements of slots may be used for locking the hinge in different positions, the hinge illustrated permits the movable member to swing from a locked position fully open on one side of the arm 16 through 360° to a locked position parallel thereto on the opposite side of arm 16, with intermediate locking positions at approximately 90°, 180° and 270°.

The bracket member 11 includes a base arm 25 and an auxiliary arm 26 having a foot portion 27 and an offset portion 28 spaced from the base arm 25 a distance adequate to receive the circular main portion 15 of the plate member without binding. Inner and outer pins 29, 30 extend between the base 25 and the offset arm portion 28. The pins are preferably spaced apart slightly more than the radius of main portion 15.

In the hinge assembly the pin 29 may be received in any of the peripheral slots 18–22, with the pin 30 being engaged with the keyway 24. Keyway 24 is comprised of a plurality of interconnecting slots, one for each of the peripheral slots 18–22, the internal slot provided for each peripheral slot permitting reciprocating or translatory movement of said bracket, whereby the pins 29, 30 may be engaged and disengaged with their respective slots. For example, peripheral slot 22 has an associated internal slot 32, the remote portion of which receives pin 30 when pin 29 is seated in slot 22. When the arm 11 is moved by translation, that is, without pivoting, the pin 30 moves from the remote end of slot 32 to the end adjacent to the slot 22, which permits pin 29 to disengage from the latter slot. With pin 29 free, the arm 11 may be swung about the circular main portion to the desired position and then shifted laterally until pin 29 engages the peripheral slot at the desired position.

In addition to the keyway 22 having a slot 32 associated with the peripheral slot 22, the keyway has slot 33 associated with peripheral slot 18, slot 34 associated with peripheral slot 19, slot 35 associated with peripheral slot 20, and slot 36 associated with peripheral slot 21. These internal slots 32–36 are interconnected thereby forming the keyway in order that the outer pin 30 is easily shiftable among all of the slots in the keyway.

Although the bracket 11 may include the cooperating spaced arm portions disclosed, the essential function of said bracket member may be carried out by pin structure mounted to engage the slots in the circular member and does not require the specific bracket disclosed. For example, the lower arm member 25 may be dispensed with and the pins engaged directly with the member to which the bracket is attached, as indicated in the modification of FIG. 7. In an alternative structure indicated in FIG. 8 the bracket member is dispensed with and the pins are connected by a leaf 38. In still another modification, FIG. 9, the pins 29', 30' are not connected but have enlarged heads which provide lateral support.

Accordingly, it will be understood that the present invention includes a hinge plate member having an arcuate peripheral portion with slots therein, each of said peripheral slots having an associated slot of substantial length within said plate and aligned therewith for receiving a spaced pin attached to a relatively removable member.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A hinge comprising a plate member having a circular main portion with an arm extending therefrom and a bracket member engaged with said circular main portion, said circular main portion having a plurality of spaced slots about its periphery and a keyway consisting of a plurality of radially extending communicating internal slots, one for each of said slots in the periphery, said bracket member comprising a pair of arms spaced to receive said circular main portion therebetween, said bracket member having a pair of pins extending between said arms and spaced apart more than the radius of said circular main portion but less than a diameter, one of said pins engaging said keyway, the other being selectively engagable with any of said peripheral slots, each of said internal slots of said circular main portion being so positioned and of a length sufficient to permit reciprocation of said other pin from within the peripheral slot to a position outside thereof in order to lock or unlock said hinge against rotation.

2. A hinge as defined in claim 1, in which said circular main portion has one or more internal slots extending nonradially.

3. The structure of claim 1, said plate member having a peripheral slot adjacent to the side of said arm of said main portion and said main portion has an internal slot extending parallel to said arm and in alignment with said peripheral slot.

4. An adjustable hinge for a pair of relatively movable members, comprising a plate having a circular main portion and attachable to one of said members, a pair of spaced pins mountable in the other member, said circular main portion having a plurality of peripheral slots for selectively receiving one of said pins and having a plurality of connected internal slots, one internal slot associated with each of said peripheral slots, for selectively receiving the other of said pins, each of said internal slots being aligned with its associated peripheral slot and having a remote portion spaced from the innermost portion of its associated peripheral slot approximately the spacing of the pins and an adjacent portion spaced from the outer extremity of its associated peripheral slot a distance less than the spacing of pins.

5. An adjustable hinge comprising a fixed first member having a circular main portion and a second member movably mounted on said first member, said first member having a plurality of spaced slots located around the periphery of said main portion and a plurality of connected internal slots, one internal slot associated with each of said peripheral slots, said second member having a pair of spaced pins, one of said pins selectively engaging one of said internal slots of said first member and the other pin selectively engaging the associated peripheral slot to lock said hinge against rotation, said slots being spaced to permit said other pin to be withdrawn from said peripheral slot to a position exteriorly of said main portion to allow said second member to be rotated substantially 360° relative to said first member and then locked in position to prevent rotation of said hinge.

References Cited in the file of this patent

FOREIGN PATENTS 499,473     Belgium _____ Mar. 16, 1951